US012518612B2

(12) United States Patent
Wu et al.

(10) Patent No.: US 12,518,612 B2
(45) Date of Patent: Jan. 6, 2026

(54) HAND TOOL OPERATION MANAGEMENT APPARATUS

(71) Applicant: MATATAKITOYO TOOL CO., LTD., Taichung (TW)

(72) Inventors: Yi-Min Wu, Taichung (TW); Victoria Wu, Taichung (TW)

(73) Assignee: MATATAKITOYO TOOL CO., LTD., Taichung (TW)

( * ) Notice: Subject to any disclaimer, the term of this patent is extended or adjusted under 35 U.S.C. 154(b) by 29 days.

(21) Appl. No.: 18/610,732

(22) Filed: Mar. 20, 2024

(65) Prior Publication Data

US 2024/0321079 A1 Sep. 26, 2024

(30) Foreign Application Priority Data

Mar. 23, 2023 (TW) ................................ 112110995

(51) Int. Cl.
*G08B 21/18* (2006.01)
*G08C 17/02* (2006.01)

(52) U.S. Cl.
CPC ............ *G08B 21/18* (2013.01); *G08C 17/02* (2013.01)

(58) Field of Classification Search
CPC ........ G08B 21/18; G08C 17/02; G01D 21/02; B25B 23/14; B25B 23/1425; B25B 23/147; B25B 21/00
See application file for complete search history.

(56) References Cited

U.S. PATENT DOCUMENTS 4,564,911 A * 1/1986 Smith ................ G05B 19/4065 73/104
8,215,187 B2 * 7/2012 Chen .................. B25B 23/1425 73/862.21

(Continued)

FOREIGN PATENT DOCUMENTS

GB 2603023 A 7/2022

OTHER PUBLICATIONS

Search Report dated Aug. 27, 2024 of the corresponding European patent application No. 24165104.1.

*Primary Examiner* — Adnan Aziz
(74) *Attorney, Agent, or Firm* — HDLS IPR SERVICES; Chun-Ming Shih

(57) ABSTRACT

A hand tool operation management apparatus includes a hand-tool-state sensing unit, a wireless communication unit, a microcontroller, and a warning unit. A wireless apparatus generates a predetermined value wireless signal including a plurality of predetermined values and wirelessly transmits the predetermined value wireless signal to the wireless communication unit. The wireless communication unit converts the predetermined value wireless signal into a predetermined value wired signal and transmits the predetermined value wired signal to the microcontroller. The hand-tool-state sensing unit senses a state of a hand tool to obtain a hand-tool-state value and transmits the hand-tool-state value to the microcontroller. The microcontroller compares the hand-tool-state value with the predetermined values. When the hand-tool-state value reaches the predetermined values, the microcontroller drives the warning unit to display or send out a warning signal, or the microcontroller informs the wireless apparatus to display or send out an alerting signal.

7 Claims, 10 Drawing Sheets

(56) References Cited

U.S. PATENT DOCUMENTS

| | | | | |
|---|---|---|---|---|
| 8,264,374 | B2 * | 9/2012 | Obatake | B25B 23/0078 701/41 |
| 8,549,932 | B1 * | 10/2013 | Schultz | G01L 11/025 73/862.21 |
| 8,584,554 | B2 * | 11/2013 | Chen | B25B 23/14 81/57 |
| 10,792,795 | B2 * | 10/2020 | Lee | B25B 23/14 |
| 11,034,003 | B2 * | 6/2021 | Reynertson, Jr. | B25B 23/1425 |
| 11,085,841 | B2 * | 8/2021 | Fly | B25B 23/00 |
| 2007/0119269 | A1 * | 5/2007 | Anjanappa | B25B 23/1425 73/862.21 |
| 2011/0107882 | A1 * | 5/2011 | Chen | B25B 23/1425 81/479 |
| 2012/0234569 | A1 | 9/2012 | Lawton et al. | |
| 2014/0165796 | A1 * | 6/2014 | Gauthier | B25G 1/005 81/479 |
| 2014/0331831 | A1 * | 11/2014 | King | B25B 23/1425 81/479 |
| 2015/0122522 | A1 * | 5/2015 | Fujimoto | B25B 21/00 173/1 |
| 2018/0333831 | A1 * | 11/2018 | Lee | G01L 25/003 |
| 2019/0118353 | A1 * | 4/2019 | Woetzl | B25B 23/1475 |
| 2021/0394344 | A1 * | 12/2021 | Mueckl | B25B 21/026 |
| 2022/0241943 | A1 * | 8/2022 | Nakamoto | B25B 23/1475 |
| 2023/0070284 | A1 * | 3/2023 | Sandy | B25F 5/00 |
| 2023/0219200 | A1 * | 7/2023 | Hu | B25B 21/00 173/176 |

* cited by examiner

HAND TOOL OPERATION MANAGEMENT APPARATUS

BACKGROUND OF THE DISCLOSURE

Technical Field

The present disclosure relates to a management apparatus, and especially relates to a hand tool operation management apparatus.

Description of Related Art

There are many types of hand tools. The hand tools may be used in a wide range of applications. The hand tools may be roughly divided into electronic hand tools and non-electronic hand tools, but whether the hand tools are the electronic hand tools or the non-electronic hand tools, the hand tools are all powerful assistants used in the mechanical assembly, so the hand tools are very important.

Although the hand tools are very important, improper use of the hand tools may cause damage to the assembled items. However, it is a pity that there is currently a lack of a hand tool operation management apparatus to effectively manage the operation of the hand tool.

SUMMARY OF THE DISCLOSURE

In order to solve the above-mentioned problems, an object of the present disclosure is to provide a hand tool operation management apparatus.

In order to achieve the object of the present disclosure mentioned above, the hand tool operation management apparatus of the present disclosure is applied to a hand tool and a wireless apparatus. The hand tool is connected to the hand tool operation management apparatus. The wireless apparatus is wirelessly connected to the hand tool operation management apparatus. The wireless apparatus includes an application program. The hand tool operation management apparatus includes a hand-tool-state sensing unit, a wireless communication unit, a microcontroller, and a warning unit. The hand-tool-state sensing unit is connected to the hand tool. The wireless communication unit is wirelessly connected to the wireless apparatus. The microcontroller is electrically connected to the hand-tool-state sensing unit and the wireless communication unit. The warning unit is electrically connected to the microcontroller. Moreover, the wireless apparatus uses the application program to select one of a plurality of modes to set a plurality of predetermined values to generate a predetermined value wireless signal including the predetermined values and wirelessly transmits the predetermined value wireless signal to the wireless communication unit. The wireless communication unit converts the predetermined value wireless signal into a predetermined value wired signal including the predetermined values and transmits the predetermined value wired signal to the microcontroller. The hand-tool-state sensing unit senses a state of the hand tool to obtain a hand-tool-state value and transmits the hand-tool-state value to the microcontroller. The microcontroller compares the hand-tool-state value with the predetermined values. When the hand-tool-state value reaches the predetermined values (namely, in response to the hand-tool-state value reaching the predetermined values), the microcontroller drives the warning unit to display (or send out) a warning signal, or the microcontroller informs the wireless apparatus to display (or send out) an alerting signal.

Moreover, in an embodiment of the hand tool operation management apparatus of the present disclosure, the hand-tool-state sensing unit is a torque sensing circuit; the predetermined values include a torque predetermined value; the state of the hand tool is a torque state; the hand-tool-state value is a hand tool torque value; the microcontroller compares the hand tool torque value with the torque predetermined value; when the hand tool torque value reaches the torque predetermined value (namely, in response to the hand tool torque value reaching the torque predetermined value), the microcontroller drives the warning unit to display (or send out) the warning signal, or the microcontroller informs the wireless apparatus to display (or send out) the alerting signal.

Moreover, in an embodiment of the hand tool operation management apparatus of the present disclosure, the modes include a peak mode, a batch mode, a block mode, and a tracking mode.

Moreover, in an embodiment of the hand tool operation management apparatus of the present disclosure, when the wireless apparatus uses the application program to select the batch mode (namely, in response to the wireless apparatus using the application program to select the batch mode), the predetermined values further include a predetermined sensing number value; when the microcontroller determines that a number which the hand tool torque value reaches the torque predetermined value reaches the predetermined sensing number value (namely, in response to the microcontroller determining that the number which the hand tool torque value reaches the torque predetermined value reaches the predetermined sensing number value), the microcontroller drives the warning unit to display (or send out) the warning signal, or the microcontroller informs the wireless apparatus to display (or send out) the alerting signal.

Moreover, in an embodiment of the hand tool operation management apparatus of the present disclosure, when the wireless apparatus uses the application program to select the block mode (namely, in response to the wireless apparatus using the application program to select the block mode), the predetermined values further include a plurality of predetermined sensing blocks; each of the predetermined sensing blocks includes a predetermined sensing number value; a sum of the predetermined sensing number values is a predetermined sensing total number value; when the microcontroller determines that a number which the hand tool torque value reaches the torque predetermined value reaches the predetermined sensing total number value (namely, in response to the microcontroller determining that the number which the hand tool torque value reaches the torque predetermined value reaches the predetermined sensing total number value), the microcontroller drives the warning unit to display (or send out) the warning signal, or the microcontroller informs the wireless apparatus to display (or send out) the alerting signal.

Moreover, in an embodiment of the hand tool operation management apparatus of the present disclosure, when the wireless apparatus uses the application program to select the tracking mode (namely, in response to the wireless apparatus using the application program to select the tracking mode), the predetermined values further include a statistical time value; during the statistical time value, the microcontroller records a plurality of the hand tool torque values to form a hand tool torque value statistical record; when the statistical time value is reached (namely, in response to the statistical time value being reached), the microcontroller drives the warning unit to display (or send out) the warning signal and informs the wireless apparatus of the hand tool torque value statistical record through the wireless communication unit, or the microcontroller informs the wireless apparatus through the wireless communication unit to display (or send out) the alerting signal and informs the wireless apparatus of the hand tool torque value statistical record through the wireless communication unit.

Moreover, in an embodiment of the hand tool operation management apparatus of the present disclosure, the microcontroller informs the wireless apparatus of the hand tool torque value and a historical record including a plurality of the hand tool torque values through the wireless communication unit; the wireless apparatus includes a display module; the wireless apparatus drives the display module to display the hand tool torque value, the historical record, and a curve graph corresponding to (namely, of) the historical record.

Moreover, in an embodiment of the hand tool operation management apparatus of the present disclosure, the predetermined values further include an error percentage value.

Moreover, in an embodiment of the hand tool operation management apparatus of the present disclosure, the predetermined values further include a sensing unit and a work item name.

Moreover, in an embodiment of the hand tool operation management apparatus of the present disclosure, the wireless communication unit is a Bluetooth wireless communication module; the error percentage value is between one percent and ten percent; the sensing unit is Newton-meter, kilogram-meter, feet-pound, or inch-pound; the warning unit is a vibrator, a buzzer, or a light emitting diode; when the warning unit is the vibrator (namely, in response to the warning unit being the vibrator), the warning signal is a vibration signal; when the warning unit is the buzzer (namely, in response to the warning unit being the buzzer), the warning signal is a sound signal; when the warning unit is the light emitting diode (namely, in response to the warning unit being the light emitting diode), the warning signal is a light signal.

The advantage of the present disclosure is to effectively manage the operation of the hand tool.

Please refer to the detailed descriptions and figures of the present disclosure mentioned below for further understanding technologies, methods, and effects and achieving the predetermined purposes of the present disclosure. Further, the purposes, characteristics, and features of the present disclosure may be more deeply and specifically understood. However, the drawings are provided only for references and descriptions and not intended to limit the scope of the present disclosure.

DETAILED DESCRIPTION

In the present disclosure, numerous specific details are provided, to provide a comprehensive understanding of embodiments of the present disclosure. However, those skilled in the art may understand that the present disclosure may be practiced without one or more of these specific details. In other instances, well-known details are not shown or described to avoid obscuring features of the present disclosure. The technical content and the detailed description of the present disclosure are as follows with reference to the figures.

Figure 1:
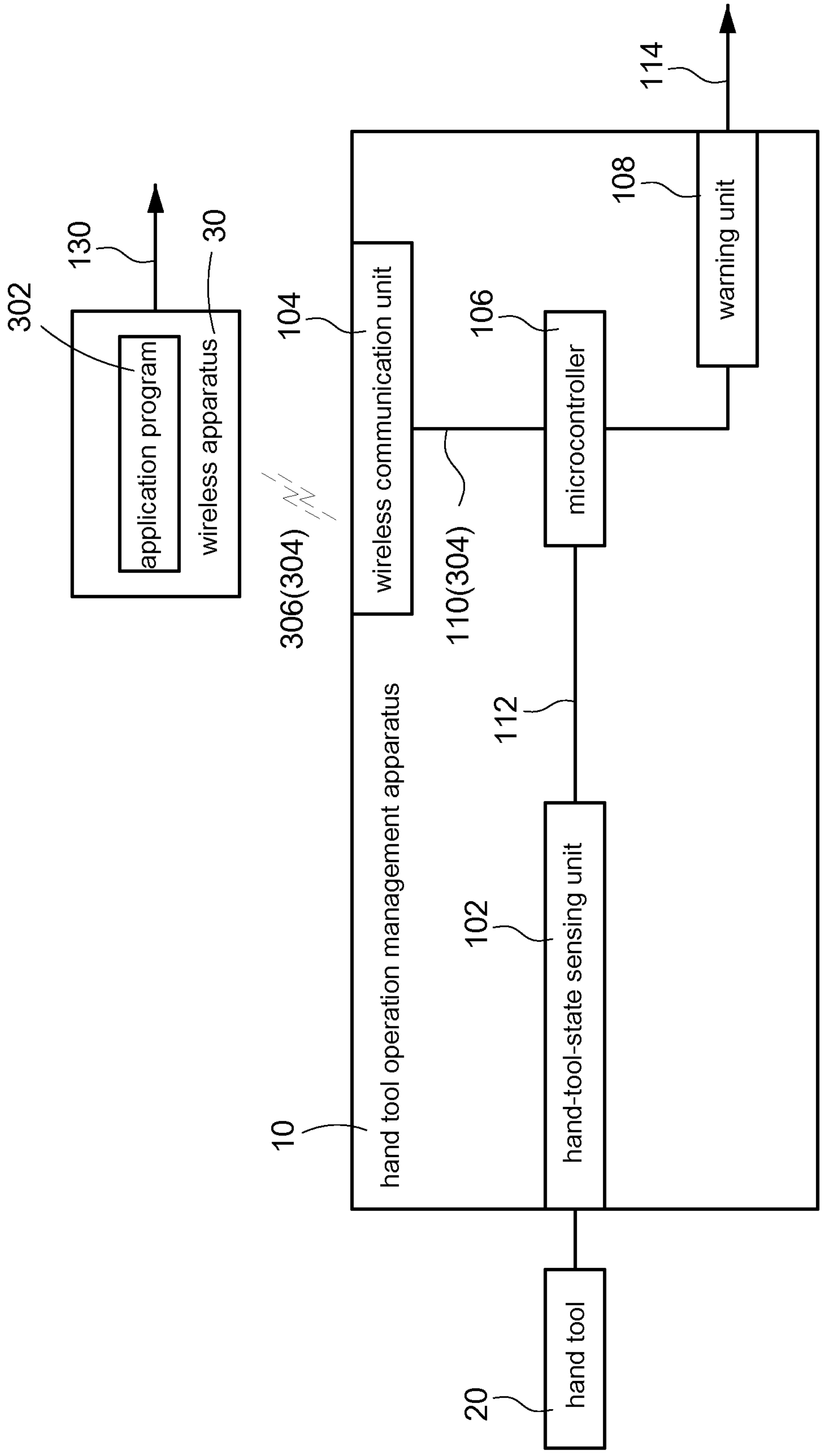
FIG. 1 shows a block diagram of the first embodiment of the hand tool operation management apparatus of the present disclosure.

FIG. 1 shows a block diagram of the first embodiment of the hand tool operation management apparatus 10 of the present disclosure. The hand tool operation management apparatus 10 is applied to a hand tool 20 and a wireless apparatus 30. The wireless apparatus 30 includes an application program (often referred to as APP) 302. The hand tool operation management apparatus 10 includes a hand-tool-state sensing unit 102, a wireless communication unit 104, a microcontroller 106, and a warning unit 108. The microcontroller 106 is electrically connected to the hand-tool-state sensing unit 102, the wireless communication unit 104, and the warning unit 108. The hand tool 20 is connected to the hand tool operation management apparatus 10. The wireless apparatus 30 is wirelessly connected to the wireless communication unit 104. Moreover, the hand tool operation management apparatus 10 may also include the wireless apparatus 30.

The hand tool 20 is a connecting rod, a torque connecting rod, a digital torque connecting rod, a wrench, a digital wrench, a digital torque wrench, a pair of wrenches, a ratchet wrench, or a steering handle. The wireless apparatus 30 is a smartphone. The hand-tool-state sensing unit 102 is a torque sensing circuit. The wireless communication unit 104 is a Bluetooth wireless communication module. The warning unit 108 is a vibrator, a buzzer, or a light emitting diode.

Figure 3:
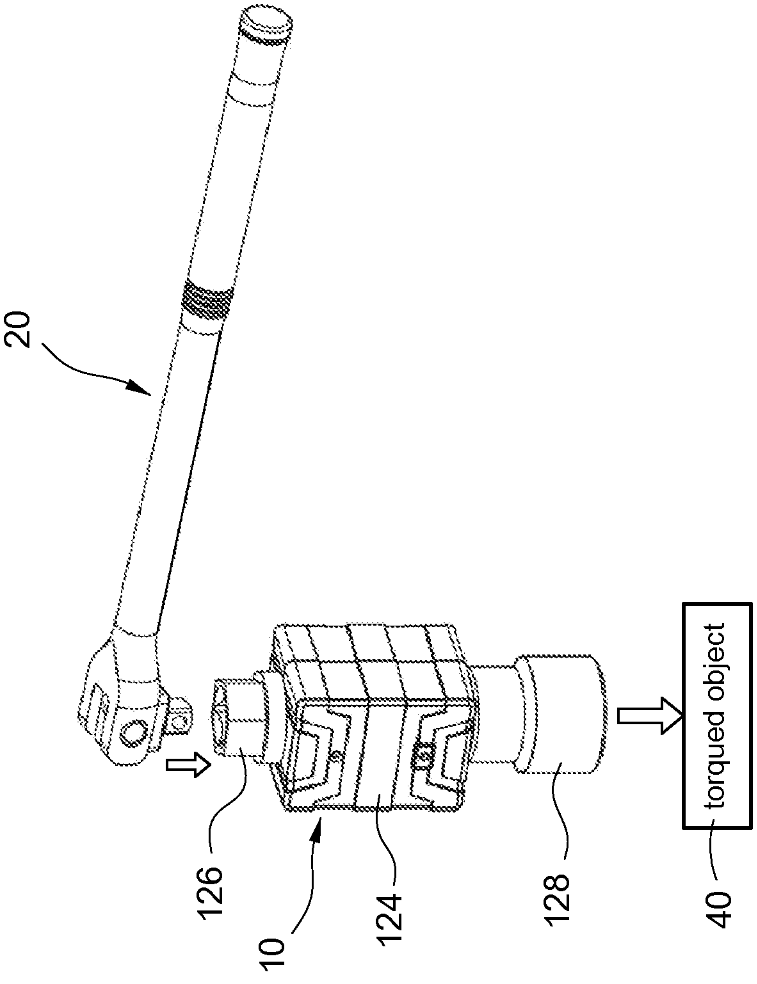
FIG. 3 shows a schematic diagram of the use of the hand tool operation management apparatus of the present disclosure.

Moreover, FIG. 3 shows a schematic diagram of the use of the hand tool operation management apparatus 10 of the present disclosure. The hand tool operation management apparatus 10 is further applied to a torqued object 40 (for example, a bolt). The hand tool operation management apparatus 10 further includes a housing 124. The hand-tool-state sensing unit 102, the wireless communication unit 104, the microcontroller 106, and the warning unit 108 are arranged in the housing 124. The housing 124 includes a first solid end 126 and a second solid end 128 which is arranged relative to the first solid end 126. The hand tool 20 is connected to the first solid end 126. The second solid end 128 is connected to the torqued object 40. The hand tool 20 is torqued (for example, clockwise) by a user to drive the hand tool operation management apparatus 10 to torque (for example, tighten) the torqued object 40, and thereby the hand tool operation management apparatus 10 may sense a torque state of the hand tool 20, which is described in detail later.

Please refer to FIG. 1 again. The wireless apparatus 30 uses the application program 302 to select one of a plurality of modes to set a plurality of predetermined values 304 to generate a predetermined value wireless signal 306 which includes the predetermined values 304 and wirelessly transmits the predetermined value wireless signal 306 to the wireless communication unit 104. Then, the wireless communication unit 104 converts the predetermined value wireless signal 306 into a predetermined value wired signal 110 which includes the predetermined values 304 and transmits the predetermined value wired signal 110 to the microcontroller 106.

Figure 4:
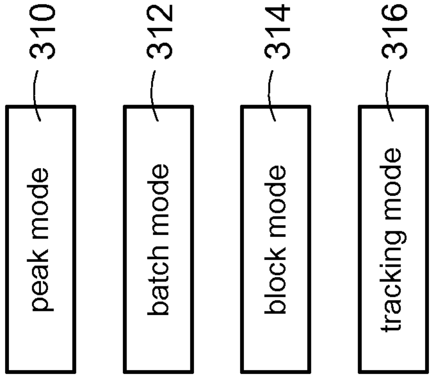
FIG. 4 shows a schematic diagram of the modes displayed by the application program used by the wireless apparatus of the present disclosure.

FIG. 4 shows a schematic diagram of the modes displayed by the application program 302 used by the wireless apparatus 30 of the present disclosure. The modes include a peak mode 310, a batch mode 312, a block mode 314, and a tracking mode 316. The wireless apparatus 30 may record a number of times of use and a torque value of the user according to the mode, and may set a number and the torque value according to the mode to display and prompt the number which is set and the torque value which is set. Moreover, the wireless apparatus 30 uses the application program 302 to display the modes and the predetermined values 304, which are described in detail as follows:

When the wireless apparatus 30 uses the application program 302 to select the peak mode 310: the predetermined values 304 include a work item name, a torque predetermined value, an error percentage value, and a sensing unit; the hand-tool-state sensing unit 102 senses a torque state of the hand tool 20 to obtain a hand-tool-state value 112 (namely, a hand tool torque value) and transmits the hand tool torque value to the microcontroller 106; the microcontroller 106 compares the hand tool torque value with the torque predetermined value; when the hand tool torque value reaches the torque predetermined value, the microcontroller 106 drives the warning unit 108 to display (or send out) a warning signal 114, or the microcontroller 106 informs the wireless apparatus 30 to display (or send out) an alerting signal 130. For example, the torque predetermined value is set to 95; the sensing unit is set to Newton-meter; when the hand tool torque value reaches 95 Newton-meter, the microcontroller 106 drives the warning unit 108 to display (or send out) the warning signal 114, or the microcontroller 106 informs the wireless apparatus 30 to display (or send out) the alerting signal 130, so that the user stops applying torque to the hand tool 20, so the user may lock, for example, the bolt with appropriate torque through the hand tool operation management apparatus 10 and the hand tool 20.

When the wireless apparatus 30 uses the application program 302 to select the batch mode 312: the predetermined values 304 include a work item name, a predetermined sensing number value, a torque predetermined value, an error percentage value, and a sensing unit; the hand-tool-state sensing unit 102 senses a torque state of the hand tool 20 to obtain a hand-tool-state value 112 (namely, a hand tool torque value) and transmits the hand tool torque value to the microcontroller 106; the microcontroller 106 compares the hand tool torque value with the torque predetermined value; when the hand tool torque value reaches the torque predetermined value, the microcontroller 106 drives the warning unit 108 to display (or send out) a warning signal 114, or the microcontroller 106 informs the wireless apparatus 30 to display (or send out) an alerting signal 130; when the microcontroller 106 determines that a number which the hand tool torque value reaches the torque predetermined value reaches the predetermined sensing number value, the microcontroller 106 drives the warning unit 108 to display (or send out) the warning signal 114, or the microcontroller 106 informs the wireless apparatus 30 to display (or send out) the alerting signal 130. For example, the predetermined sensing number value is set to 10 (namely, for example, 10 bolts are to be tightened); the torque predetermined value is set to 95; the sensing unit is set to Newton-meter; when the hand tool torque value reaches 95 Newton-meter, the microcontroller 106 drives the warning unit 108 to display (or send out) the warning signal 114, or the microcontroller 106 informs the wireless apparatus 30 to display (or send out) the alerting signal 130, so that the user stops applying torque to the hand tool 20, so the user may lock, for example, the bolts with appropriate torque through the hand tool operation management apparatus 10 and the hand tool 20; when the microcontroller 106 determines that the number which the hand tool torque value reaches 95 Newton-meter reaches 10 (which means that 10 bolts have been tightened), the microcontroller 106 drives the warning unit 108 to display (or send out) the warning signal 114, or the microcontroller 106 informs the wireless apparatus 30 to display (or send out) the alerting signal 130, so that the user knows that 10 bolts have been tightened. Another embodiment of the batch mode 312 is that: a batch of 50 times may be set; when the user performs the torque operation 50 times or the torque value is reached, the wireless apparatus 30 may display (or send out) the alerting signal 130.

When the wireless apparatus 30 uses the application program 302 to select the block mode 314: the predetermined values 304 include a work item name, a plurality of predetermined sensing blocks, a torque predetermined value, an error percentage value, and a sensing unit; each of the predetermined sensing blocks includes a predetermined sensing number value; a sum of the predetermined sensing number values is a predetermined sensing total number value; the hand-tool-state sensing unit 102 senses a torque state of the hand tool 20 to obtain a hand-tool-state value 112 (namely, a hand tool torque value) and transmits the hand tool torque value to the microcontroller 106; the microcontroller 106 compares the hand tool torque value with the torque predetermined value; when the hand tool torque value reaches the torque predetermined value, the microcontroller 106 drives the warning unit 108 to display (or send out) a warning signal 114, or the microcontroller 106 informs the wireless apparatus 30 to display (or send out) an alerting signal 130; when the microcontroller 106 determines that a number which the hand tool torque value reaches the torque predetermined value reaches the predetermined sensing total number value, the microcontroller 106 drives the warning unit 108 to display (or send out) the warning signal 114, or the microcontroller 106 informs the wireless apparatus 30 to display (or send out) the alerting signal 130. For example, the predetermined sensing blocks is set to 3 (namely, for example, there are 3 blocks to be processed, which are a first block, a second block, and a third block); the torque predetermined value is set to 95; the sensing unit is set to Newton-meter; the predetermined sensing number value of the first block is set to 3 (namely, for example, 3 bolts are to be tightened); the predetermined sensing number value of the second block is set to 4 (namely, for example, 4 bolts are to be tightened); the predetermined sensing number value of the third block is set to 5 (namely, for example, 5 bolts are to be tightened); therefore, the predetermined sensing total number value is 12 (namely, 3+4+5=12); when the hand tool torque value reaches 95 Newton-meter, the microcontroller 106 drives the warning unit 108 to display (or send out) the warning signal 114, or the microcontroller 106 informs the wireless apparatus 30 to display (or send out) the alerting signal 130, so that the user stops applying torque to the hand tool 20, so the user may lock, for example, the bolts with appropriate torque through the hand tool operation management apparatus 10 and the hand tool 20; when the microcontroller 106 determines that the number which the hand tool torque value reaches 95 Newton-meter reaches 12 (which means that 12 bolts have been tightened), the microcontroller 106 drives the warning unit 108 to display (or send out) the warning signal 114, or the microcontroller 106 informs the wireless apparatus 30 to display (or send out) the alerting signal 130, so that the user knows that 12 bolts have been tightened. Another embodiment of the block mode 314 is that: multiple groups may be set; for example, a total of four groups A, B, C, and D are set, wherein the group A is set to 5 times, the group B is set to 4 times, the group C is set to 5 times, and the group D is set to 4 times; when the torque value which is set is reached, the warning signal 114 (or the alerting signal 130) is displayed (or sent out); when the number of times is reached, the warning signal 114 (or the alerting signal 130) is displayed (or sent out) as well.

When the wireless apparatus 30 uses the application program 302 to select the tracking mode 316: the predetermined values 304 include a work item name, a statistical time value, a torque predetermined value, an error percentage value, and a sensing unit; the hand-tool-state sensing unit 102 senses a torque state of the hand tool 20 to obtain a hand-tool-state value 112 (namely, a hand tool torque value) and transmits the hand tool torque value to the microcontroller 106; the microcontroller 106 compares the hand tool torque value with the torque predetermined value; when the hand tool torque value reaches the torque predetermined value, the microcontroller 106 drives the warning unit 108 to display (or send out) a warning signal 114, or the microcontroller 106 informs the wireless apparatus 30 to display (or send out) an alerting signal 130; during the statistical time value, the microcontroller 106 records a plurality of the hand tool torque values to form a hand tool torque value statistical record; when the statistical time value is reached, the microcontroller 106 drives the warning unit 108 to display (or send out) the warning signal 114 and informs the wireless apparatus 30 of the hand tool torque value statistical record through the wireless communication unit 104, or the microcontroller 106 informs the wireless apparatus 30 through the wireless communication unit 104 to display (or send out) the alerting signal 130 and informs the wireless apparatus 30 of the hand tool torque value statistical record through the wireless communication unit 104. For example, the statistical time value is set to 10 minutes; the torque predetermined value is set to 95; the sensing unit is set to Newton-meter; when the hand tool torque value reaches 95 Newton-meter, the microcontroller 106 drives the warning unit 108 to display (or send out) the warning signal 114, or the microcontroller 106 informs the wireless apparatus 30 through the wireless communication unit 104 to display (or send out) the alerting signal 130, so that the user stops applying torque to the hand tool 20, so the user may lock, for example, the bolts with appropriate torque through the hand tool operation management apparatus 10 and the hand tool 20; during the 10 minutes, the microcontroller 106 records a plurality of the hand tool torque values to form the hand tool torque value statistical record; when the 10 minutes is reached, the microcontroller 106 drives the warning unit 108 to display (or send out) the warning signal 114 (by which the user knows that 10 minutes has been reached) and informs the wireless apparatus 30 of the hand tool torque value statistical record through the wireless communication unit 104, or the microcontroller 106 informs the wireless apparatus 30 through the wireless communication unit 104 to display (or send out) the alerting signal 130 and informs the wireless apparatus 30 of the hand tool torque value statistical record through the wireless communication unit 104 (so that the user knows the hand tool torque value statistical record in the last 10 minutes).

The error percentage value is between one percent and ten percent. The sensing unit is Newton-meter, kilogram-meter, feet-pound, or inch-pound. When the warning unit 108 is the vibrator, the warning signal 114 is a vibration signal. When the warning unit 108 is the buzzer, the warning signal 114 is a sound signal. When the warning unit 108 is the light emitting diode, the warning signal 114 is a light signal.

Figure 2:
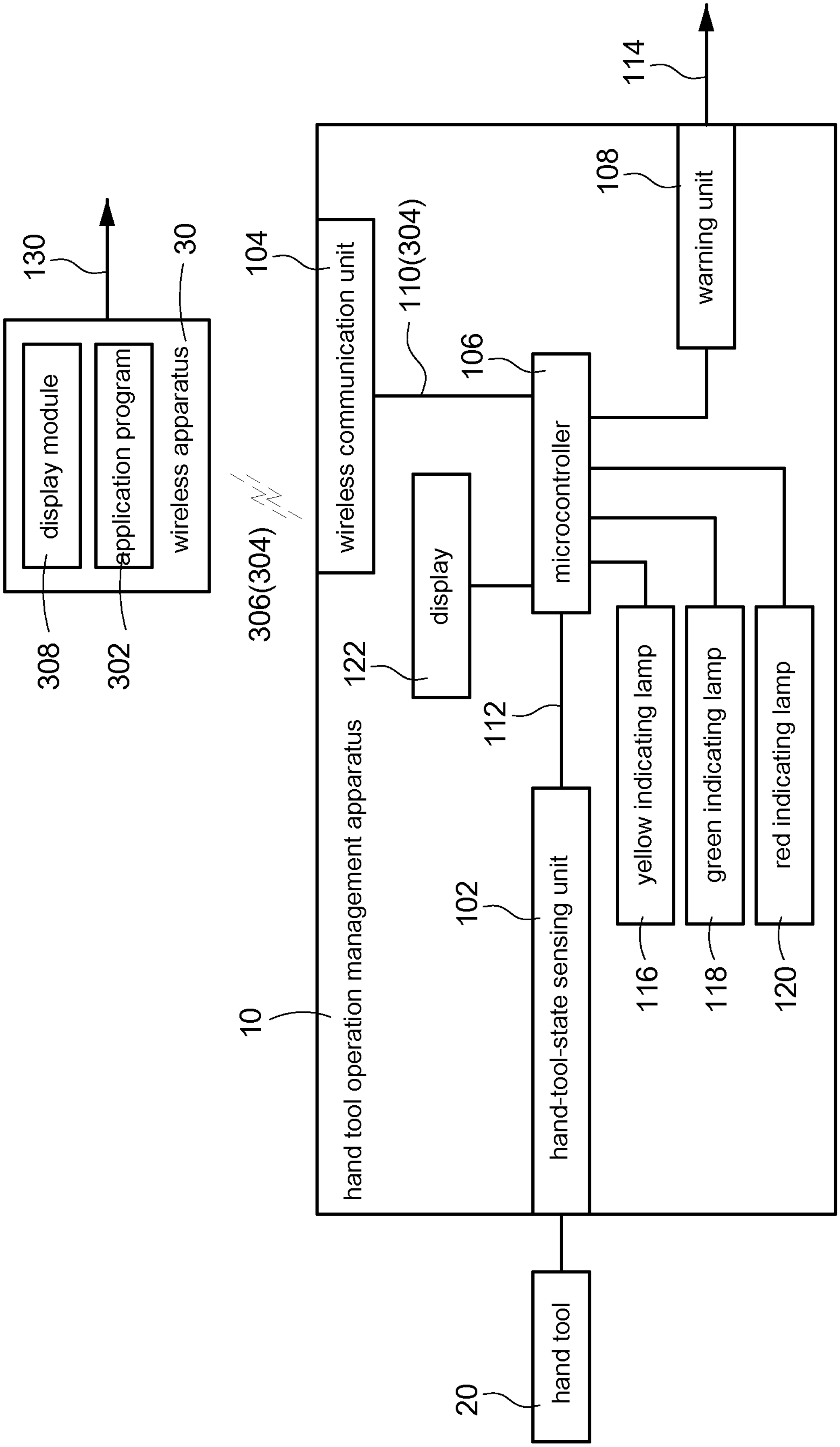
FIG. 2 shows a block diagram of the second embodiment of the hand tool operation management apparatus of the present disclosure.

FIG. 2 shows a block diagram of the second embodiment of the hand tool operation management apparatus 10 of the present disclosure. The descriptions of the elements shown in FIG. 2 which are the same as the elements shown in FIG. 1 are not repeated here for brevity. The wireless apparatus 30 includes a display module 308. The microcontroller 106 informs the wireless apparatus 30 of the hand tool torque value and a historical record which includes a plurality of the hand tool torque values (for example, five recent hand tool torque values) through the wireless communication unit 104. The wireless apparatus 30 drives the display module 308 to display the hand tool torque value, the historical record, and a curve graph corresponding to the historical record.

Moreover, a torque error value is defined as the torque predetermined value multiplied by the error percentage value. A torque lower limit value is defined as the torque predetermined value minus the torque error value. A torque upper limit value is defined as the torque predetermined value plus the torque predetermined value. When the hand tool torque value is less than the torque lower limit value, the wireless apparatus 30 drives the display module 308 to emit a yellow light. When the hand tool torque value is greater than (or equal to) the torque lower limit value and less than (or equal to) the torque upper limit value, the wireless apparatus 30 drives the display module 308 to emit a green light. When the hand tool torque value is greater than the torque upper limit value, the wireless apparatus 30 drives the display module 308 to emit a red light. Therefore, the user may quickly know whether the current hand tool torque value reaches the standard; if the current hand tool torque value reaches the standard, the display module 308 of the wireless apparatus 30 emits the green light.

For example, the torque predetermined value is 100 Nm, and the error percentage value is 5%, so the torque error value is 5 Nm, so that the torque lower limit value is 95 Nm, and the torque upper limit value is 105 Nm. When the hand tool torque value is less than 95 Nm, the wireless apparatus 30 drives the display module 308 to emit the yellow light. When the hand tool torque value is greater than (or equal to) 95 Nm and less than (or equal to) 105 Nm, the wireless apparatus 30 drives the display module 308 to emit the green light. When the hand tool torque value is greater than 105 Nm, the wireless apparatus 30 drives the display module 308 to emit the red light.

Moreover, the hand tool operation management apparatus 10 further includes a yellow indicating lamp 116, a green indicating lamp 118, a red indicating lamp 120, and a display 122. The yellow indicating lamp 116 is electrically connected to the microcontroller 106. The green indicating lamp 118 is electrically connected to the microcontroller 106. The red indicating lamp 120 is electrically connected to the microcontroller 106. The display 122 is electrically connected to the microcontroller 106. The microcontroller 106 drives the display 122 to display the hand tool torque value. When the hand tool torque value is less than the torque lower limit value, the microcontroller 106 drives the yellow indicating lamp 116 to light up. When the hand tool torque value is greater than (or equal to) the torque lower limit value and less than (or equal to) the torque upper limit value, the microcontroller 106 drives the green indicating lamp 118 to light up. When the hand tool torque value is greater than the torque upper limit value, the microcontroller 106 drives the red indicating lamp 120 to light up. Therefore, the user may quickly know whether the current hand tool torque value reaches the standard; if the current hand tool torque value reaches the standard, the green indicating lamp 118 of the hand tool operation management apparatus 10 lights up.

FIG. 5*a* to FIG. 5*d* show first schematic diagrams of the new work item displayed by the application program 302 used by the wireless apparatus 30 of the present disclosure. FIG. 6*a* to FIG. 6*b* show second schematic diagrams of the new work item displayed by the application program 302 used by the wireless apparatus 30 of the present disclosure.

Figure 5A:
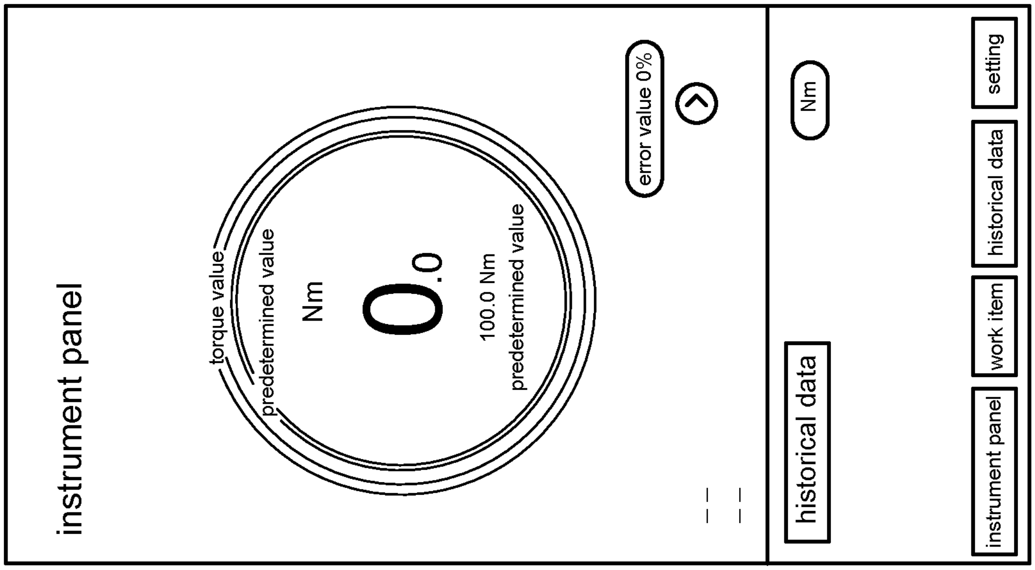
FIG. 5*a* to FIG. 5*d* show first schematic diagrams of the new work item displayed by the application program used by the wireless apparatus of the present disclosure.
Figure 5B:
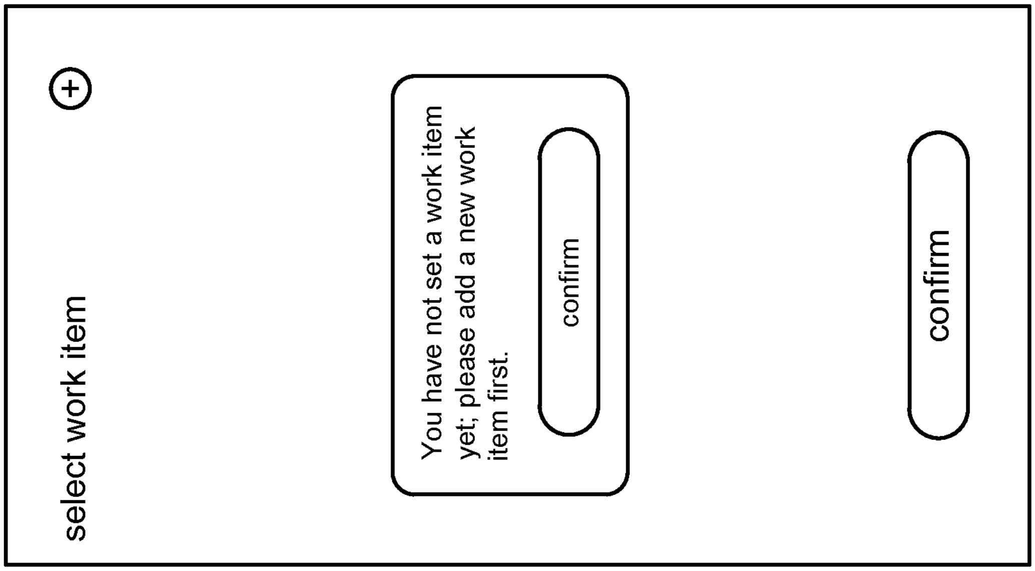
Figure 6B:
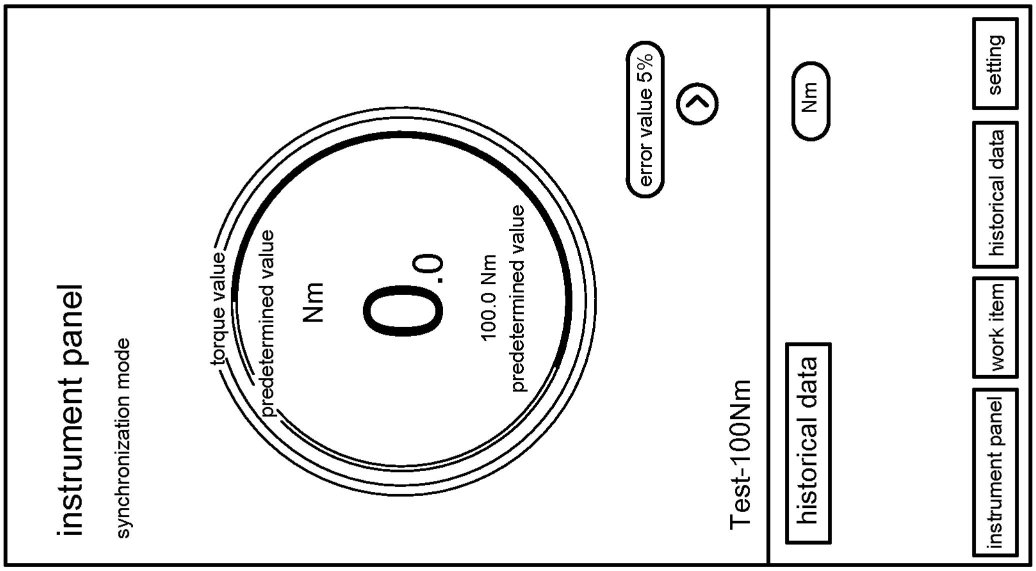
FIG. 6*a* to FIG. 6*b* show second schematic diagrams of the new work item displayed by the application program used by the wireless apparatus of the present disclosure.
Figure 6A:
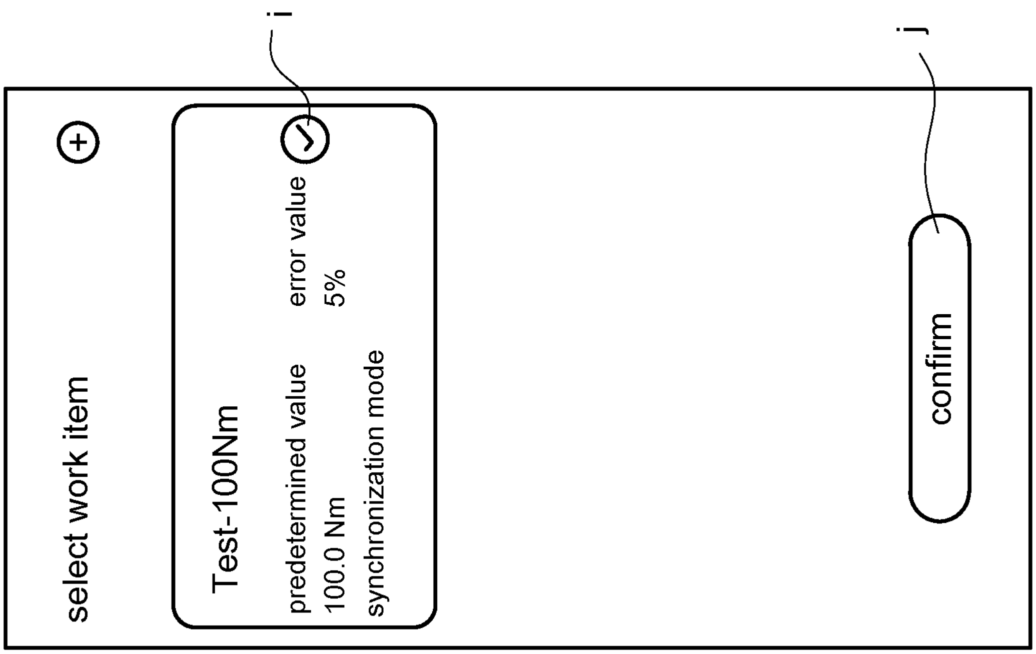

First, the user may tap the "work item" button at the bottom of FIG. 5*a* to enter FIG. 5*b*.

Figure 5C:
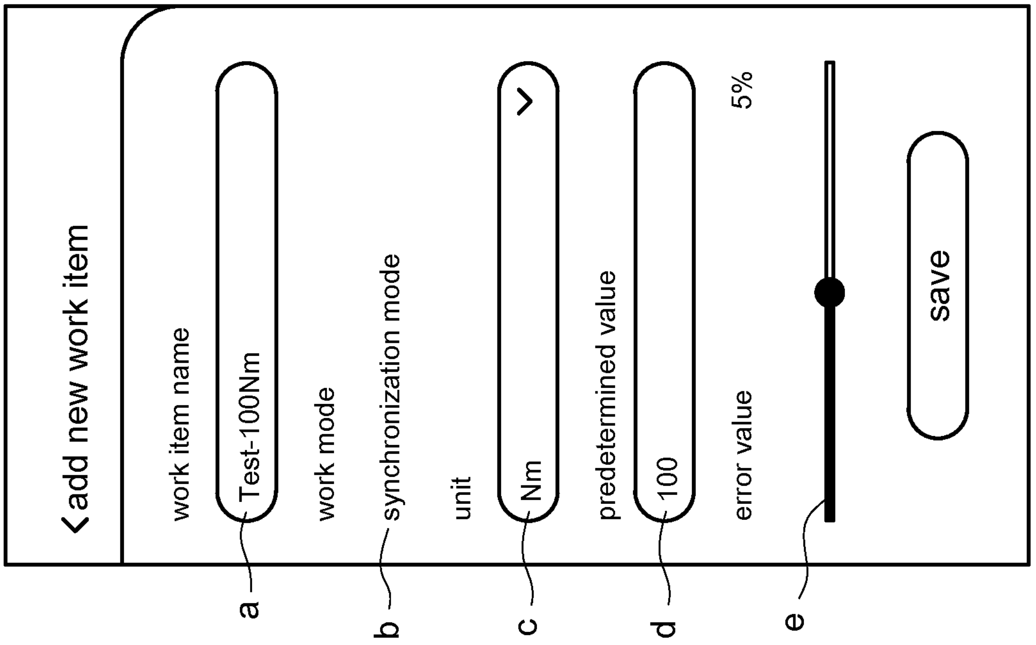

Then, in FIG. 5*b*, the user may tap the "+" button in the upper right corner to enter FIG. 5*c* to add a new work item.

Then, in FIG. 5*c*, the user may fill in, set, or select multiple related information a-e, and then tap the "save" button below to enter FIG. 5*d*, wherein the related information a represents the work item name which may be customized by the user, the related information b represents the selection of the work mode (a synchronization mode or the peak mode 310, the batch mode 312, the block mode 314, or the tracking mode 316 mentioned above may be selected), the related information c represents the selection of the unit (Newton-meter, kilogram-meter, feet-pound, or inch-pound mentioned above may be selected), the related information d represents filling in the torque predetermined value, and the related information e represents setting the error percentage value.

Figure 5D:
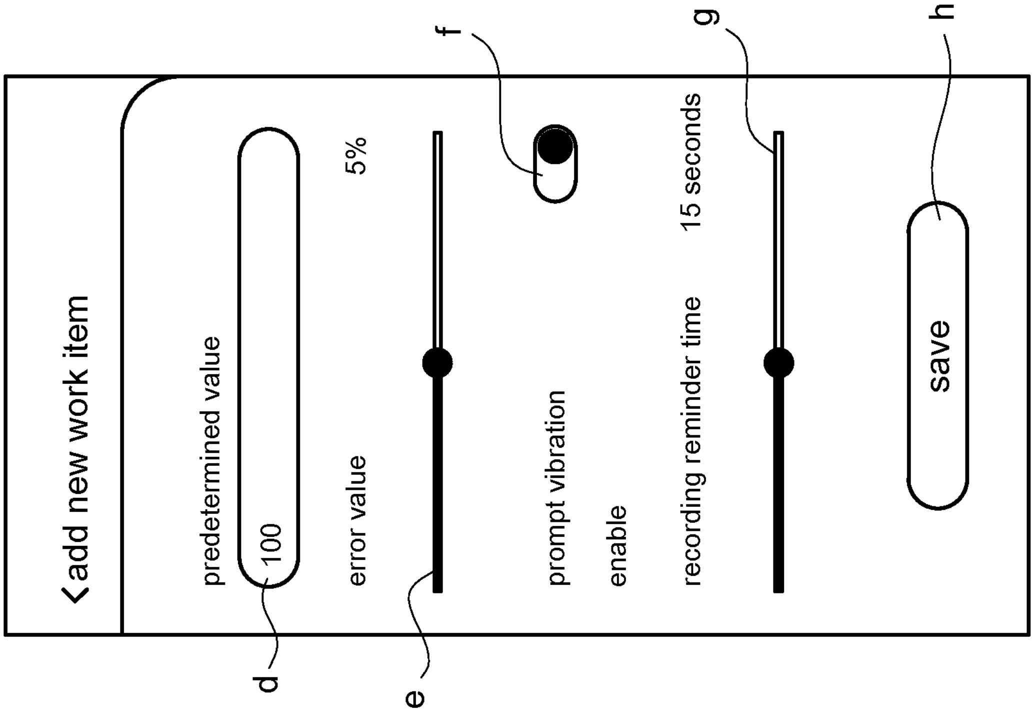

Then, in FIG. 5*d*, the user may reconfirm or adjust the related information d and the related information e, and may set multiple related information f-g, and then may tap the save button h (at this time, the new work item has been completed), so as to enter FIG. 6*a*, wherein the related information f represents whether to enable the vibration reminder, and the related information g represents the setting of the recording reminder time length (which may be set to between 0 and 30 seconds). The status description of the related information g includes the following three points: 1. when the input torque does not reach the predetermined value; 2. when the number is reached, inputting the torque again is regarded as save; 3. when the time is set to 0 second, there is no prompt.

Finally, in FIG. 6*a*, the user may select a work item in a related information i, and then may tap the save button j to enter FIG. 6*b* (the main screen, which means that the user may start to use the work item which is selected).

Figure 7B:
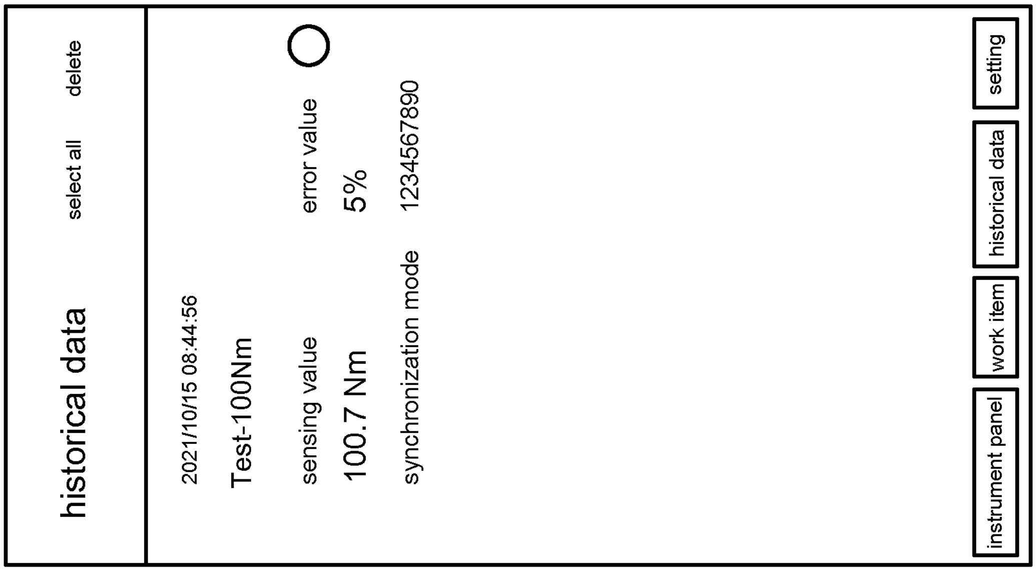
FIG. 7*a* to FIG. 7*c* show first schematic diagrams of the historical data displayed by the application program used by the wireless apparatus of the present disclosure.
Figure 7A:
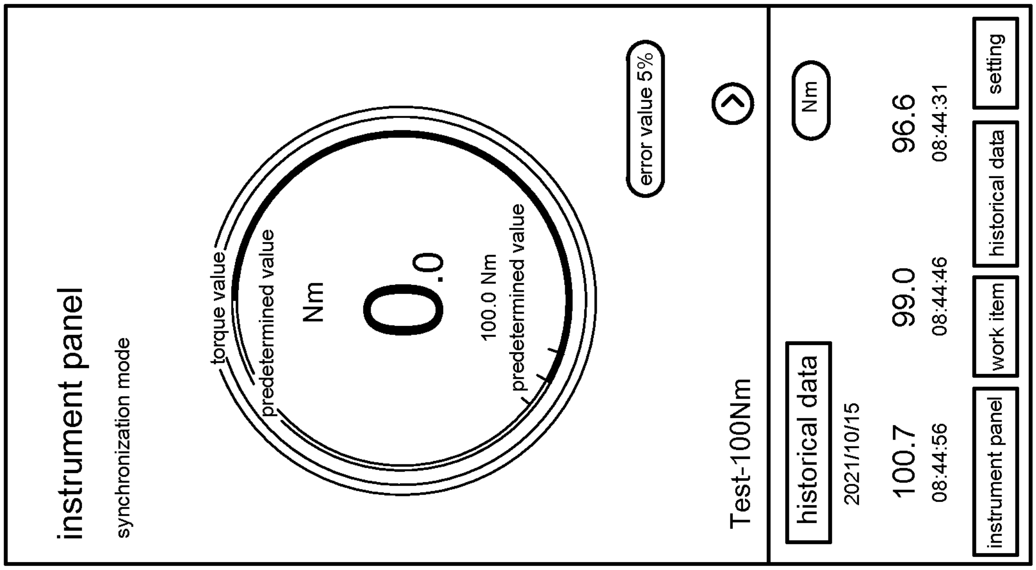
Figure 7C:
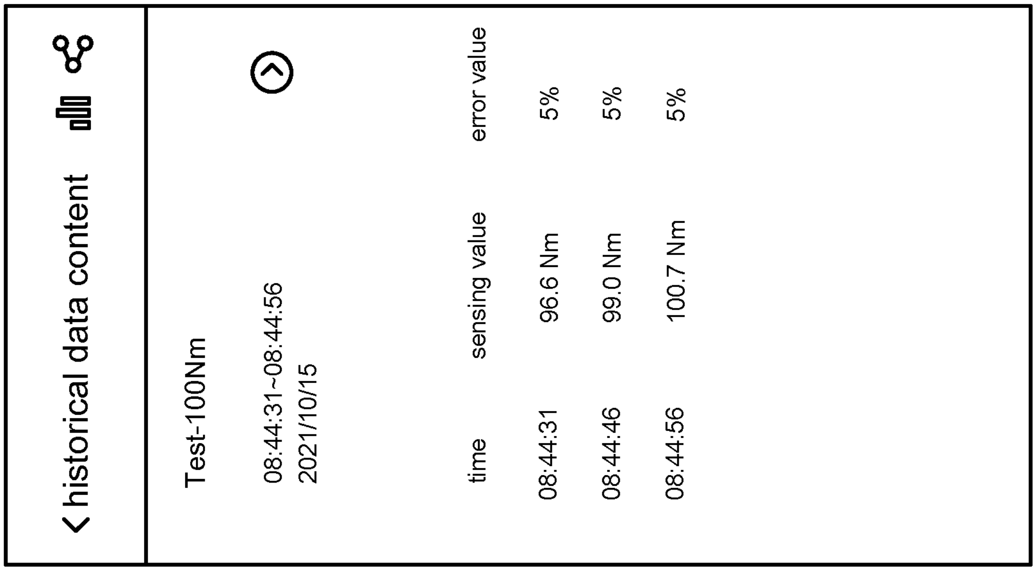
Figure 8A:
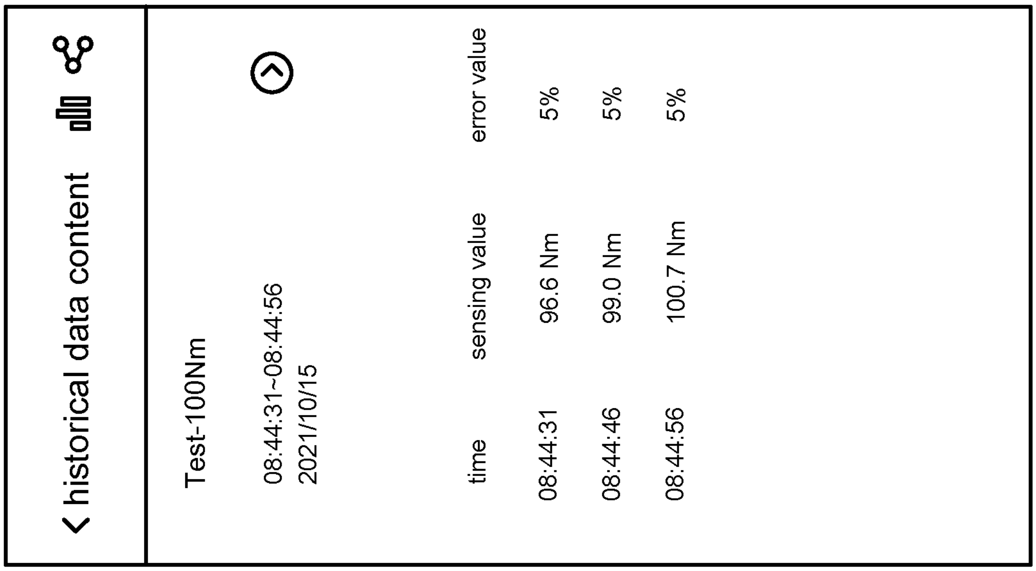
FIG. 8*a* to FIG. 8*b* show second schematic diagrams of the historical data displayed by the application program used by the wireless apparatus of the present disclosure.
Figure 8B:
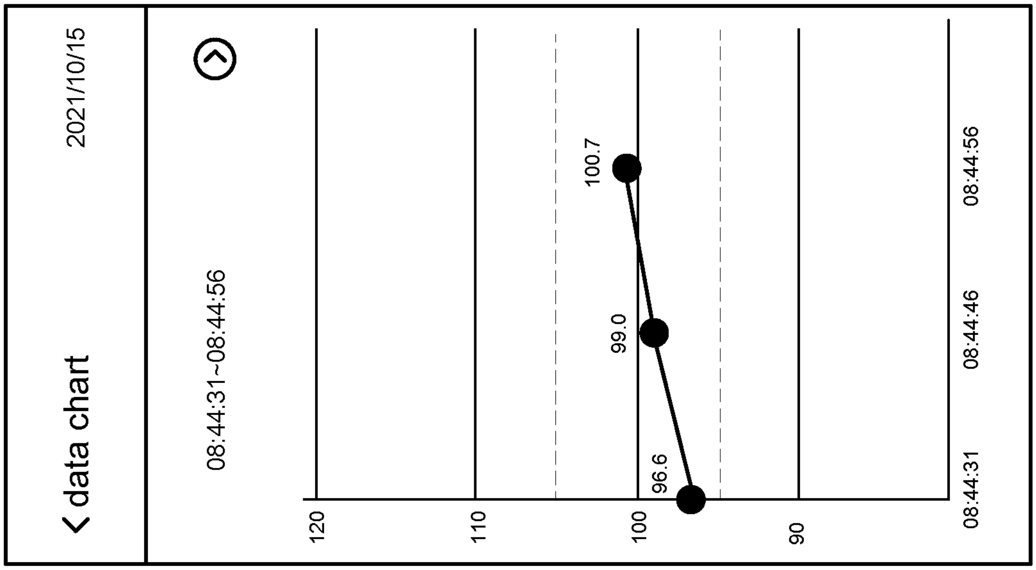
Figure 9A:
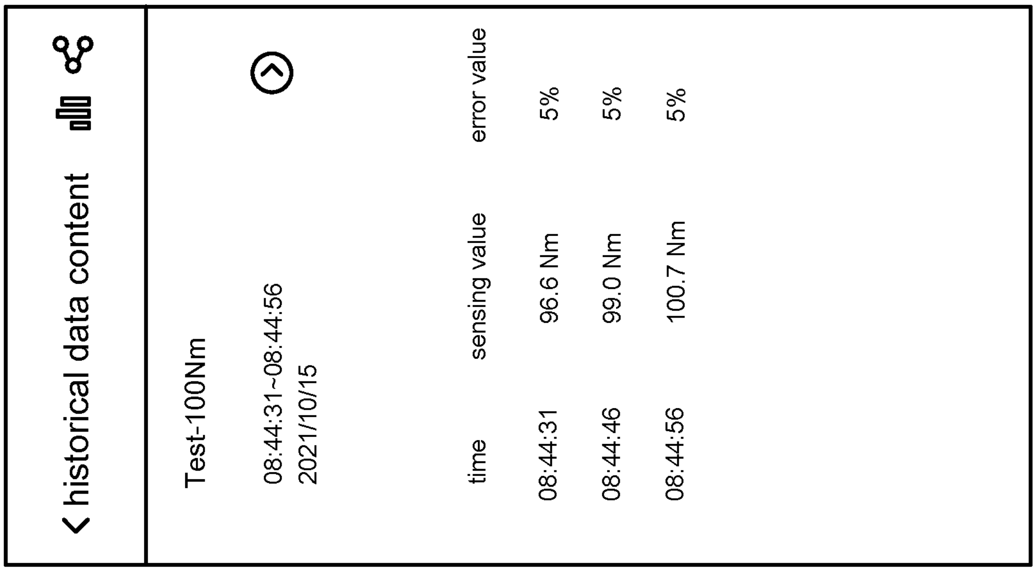
FIG. 9*a* to FIG. 9*c* show third schematic diagrams of the historical data displayed by the application program used by the wireless apparatus of the present disclosure.
Figure 9C:
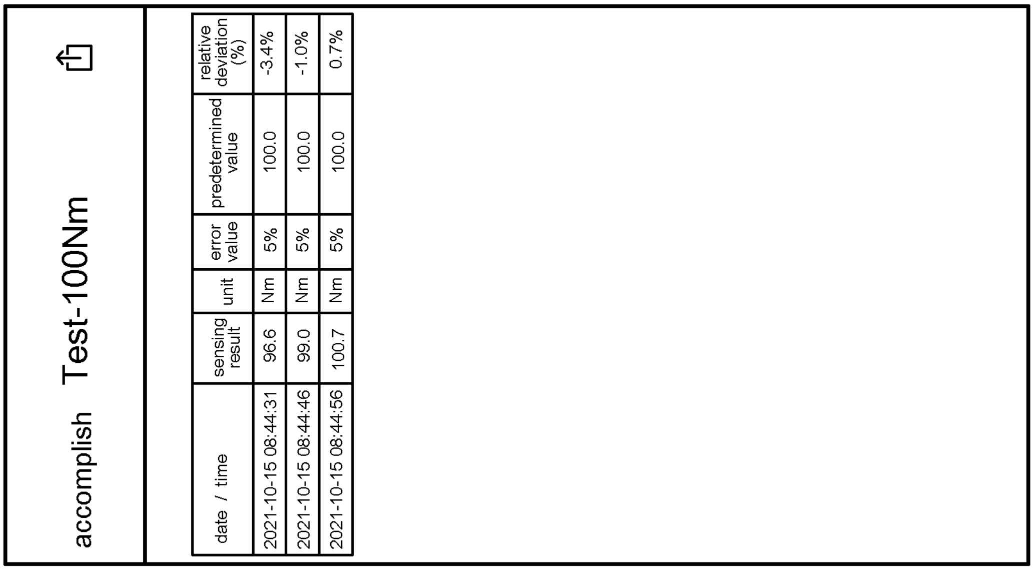
Figure 9B:
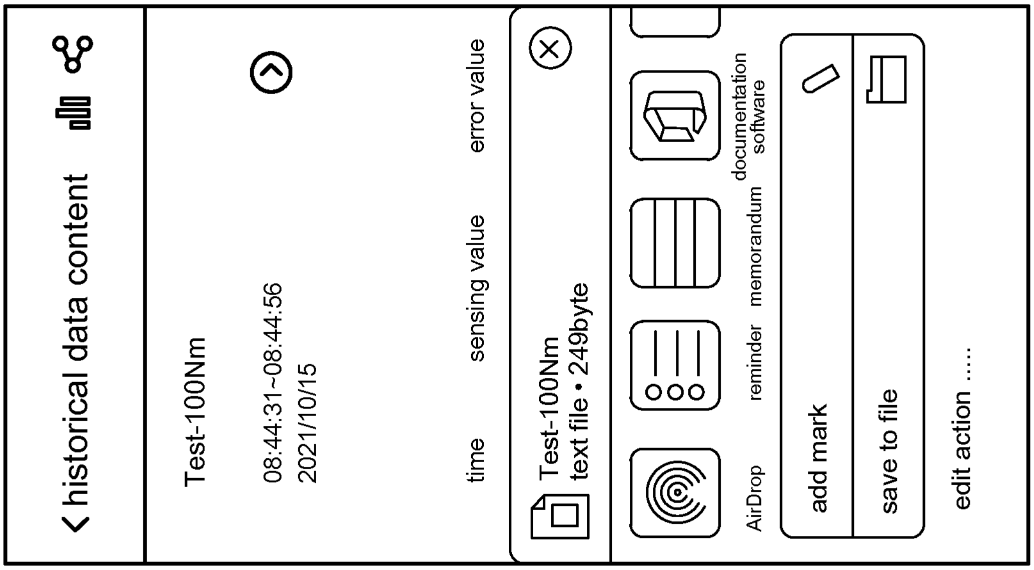

FIG. 7*a* to FIG. 7*c* show first schematic diagrams of the historical data displayed by the application program 302 used by the wireless apparatus 30 of the present disclosure. FIG. 8*a* to FIG. 8*b* show second schematic diagrams of the historical data displayed by the application program 302 used by the wireless apparatus 30 of the present disclosure. FIG. 9*a* to FIG. 9*c* show third schematic diagrams of the historical data displayed by the application program 302 used by the wireless apparatus 30 of the present disclosure.

First, the user may tap the "historical data" button at the bottom of FIG. 7*a* to enter FIG. 7*b*.

Then, in FIG. 7*b*, the user may tap the work item for which the historical data is to be queried to enter FIG. 7*c*.

Then, FIG. 7*c* shows the historical data content.

Then, please refer to FIG. 8*a*. In the screen showing the historical data content, the user may tap the second symbol from right to left in the upper right corner (namely, a data chart symbol) to enter FIG. 8*b*.

Then, FIG. 8*b* shows the data chart.

Then, please refer to FIG. 9*a*. In the screen showing the historical data content, the user may tap the first symbol from right to left in the upper right corner (namely, a sharing symbol) to enter FIG. 9*b*.

Then, the user may select a sharing method/path in FIG. 9*b*.

Finally, FIG. 9*c* shows a sharing list.

The advantage of the present disclosure is to effectively manage the operation of the hand tool.

Although the present disclosure has been described with reference to the embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure.

What is claimed is:

1. A system comprising a hand tool operation management apparatus applied to a hand tool and a wireless apparatus, wherein the system comprises the hand tool and the wireless apparatus; the hand tool connected to the hand tool operation management apparatus, the wireless apparatus wirelessly connected to the hand tool operation management apparatus, the wireless apparatus comprising an application program, the hand tool operation management apparatus comprising:

- a hand-tool-state sensing unit connected to the hand tool;
- a wireless communication unit wirelessly connected to the wireless apparatus;
- a microcontroller electrically connected to the hand-tool-state sensing unit and the wireless communication unit; and
- a warning unit electrically connected to the microcontroller,
- wherein the wireless apparatus uses the application program to select one of a plurality of modes to set a plurality of predetermined values to generate a predetermined value wireless signal including the predetermined values and wirelessly transmits the predetermined value wireless signal to the wireless communication unit; the wireless communication unit converts the predetermined value wireless signal into a predetermined value wired signal including the predetermined values and transmits the predetermined value wired signal to the microcontroller; the hand-tool-state sensing unit senses a state of the hand tool to obtain a hand-tool-state value and transmits the hand-tool-state value to the microcontroller; the microcontroller compares the hand-tool-state value with the predetermined values; when the hand-tool-state value reaches the predetermined values, the microcontroller drives the warning unit to display or send out a warning signal, or the microcontroller informs the wireless apparatus to display or send out an alerting signal;

wherein the hand-tool-state sensing unit is a torque sensing circuit; the predetermined values comprise a torque predetermined value; the state of the hand tool is a torque state; the hand-took-state value is a hand tool torque value; the microcontroller compares the hand tool torque value with the torque predetermined value; when the hand tool torque value reaches the torque predetermined value, the microcontroller drives the warning unit to display or send out the warning signal or the microcontroller informs the wireless apparatus to display or send out the alerting signal;

wherein the modes comprise a peak mode, a batch mode, a block mode, and a tracking mode;

wherein when the wireless apparatus uses the application program to select the tracking mode, the predetermined values further comprise a statistical time value; during the statistical time value, the microcontroller records a plurality of the hand tool torque values to form a hand tool torque value statistical record; when the statistical tire value is reached, the microcontroller drives the warning unit to display or send out the warning signal and informs the wireless apparatus of the hand tool torque value statistical record through the wireless communication unit, or the microcontroller informs the wireless apparatus through the wireless communication unit to display or send out the alerting signal and informs the wireless apparatus of the hand tool torque value statistical record through the wireless communication unit.

2. The system of claim 1, wherein when the wireless apparatus uses the application program to select the batch mode, the predetermined values further comprise a predetermined sensing number value; when the microcontroller determines that a number which the hand tool torque value reaches the torque predetermined value reaches the predetermined sensing number value, the microcontroller drives the warning unit to display or send out the warning signal, or the microcontroller informs the wireless apparatus to display or send out the alerting signal.

3. The system of claim 1, wherein when the wireless apparatus uses the application program to select the block mode, the predetermined values further comprise a plurality of predetermined sensing blocks; each of the predetermined sensing blocks comprises a predetermined sensing number value; a sum of the predetermined sensing number values is a predetermined sensing total number value; when the microcontroller determines that a number which the hand tool torque value reaches the torque predetermined value reaches the predetermined sensing total number value, the microcontroller drives the warning unit to display or send out the warning signal, or the microcontroller informs the wireless apparatus to display or send out the alerting signal.

4. The system of claim 1, wherein the microcontroller informs the wireless apparatus of the hand tool torque value and a historical record comprising a plurality of the hand tool torque values through the wireless communication unit; the wireless apparatus comprises a display module; the wireless apparatus drives the display module to display the hand tool torque value, the historical record, and a curve graph corresponding to the historical record.

5. The system of claim 4, wherein the predetermined values further comprise an error percentage value.

6. The system of claim 5, wherein the predetermined values further comprise a sensing unit and a work item name.

7. The system of claim 6, wherein the wireless communication unit is a Bluetooth wireless communication module; the error percentage value is between one percent and ten percent; the sensing unit is newton-meter, kilogram-meter, feet-pound, or inch-pound; the warning unit is a vibrator, a buzzer, or a light emitting diode; when the warning unit is the vibrator, the warning signal is a vibration signal; when the warning unit is the buzzer, the warning signal is a sound signal; when the warning unit is the light emitting diode, the warning signal is a light signal.

* * * * *